(12) United States Patent
Hadjichristidis et al.

(10) Patent No.: US 10,100,149 B2
(45) Date of Patent: Oct. 16, 2018

(54) METHOD OF PREPARING WELL-DEFINED POLYPEPTIDES VIA ROP

(71) Applicant: KING ABDULLAH UNIVERSITY OF SCIENCE AND TECHNOLOGY, Thuwal (SA)

(72) Inventors: Nikolaos Hadjichristidis, Thuwal (SA); Wei Zhao, Thuwal (SA); Yves Gnanou, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 40 days.

(21) Appl. No.: 15/126,276

(22) PCT Filed: Mar. 17, 2015

(86) PCT No.: PCT/IB2015/001146
§ 371 (c)(1),
(2) Date: Sep. 14, 2016

(87) PCT Pub. No.: WO2015/140649
PCT Pub. Date: Sep. 24, 2015

(65) Prior Publication Data
US 2017/0166696 A1 Jun. 15, 2017

Related U.S. Application Data

(60) Provisional application No. 61/954,262, filed on Mar. 17, 2014.

(51) Int. Cl.
*C08G 69/10* (2006.01)
*C08G 69/04* (2006.01)

(52) U.S. Cl.
CPC ............ *C08G 69/10* (2013.01); *C08G 69/04* (2013.01)

(58) Field of Classification Search
None
See application file for complete search history.

(56) References Cited

FOREIGN PATENT DOCUMENTS

WO 2009/058291 5/2009

OTHER PUBLICATIONS

Nikos Hadjichristidis . . . , "Synthesis of Well-Defined Polypeptide-Based Materials via the Ring-Opening Polymerization of r-Amino Acid N-Carboxyanhydrides", Chem. Rev. 2009, 109, 5528-5578.*
STIC Structural search for U.S. Appl. No. 15/126,276 (dated Mar. 30, 2018).*
International Preliminary Report on Patentability dated Sep. 20, 2016, issued in International Application No. PCT/IB2015/001146.
Notification Concerning Transmittal of International Preliminary Report on Patentability (Chapter I of the Patent Cooperation Treaty) dated Sep. 29, 2016, issued in International Application No. PCT/IB2015/001146.
International Search Report dated Sep. 21, 2015, issued in International Application No. PCT/IB2015/001146.
Written Opinion of the International Searching Authority dated Sep. 21, 2015, issued in International Application No. PCT/IB2015/001146.
Deming T J: "Polypeptide and polypeptide hybrid copolymer synthesis via NCA polymerization", Feb. 23, 2006 (Feb. 23, 2006), Peptide Hybrid Polymers, Springer-Verlag Berlin Heidelberg, Berlin Heidelberg, pp. 1-18.

* cited by examiner

*Primary Examiner* — Ling Choi
*Assistant Examiner* — Gennadiy Mesh
(74) *Attorney, Agent, or Firm* — Pabst Patent Group LLP

(57) ABSTRACT

A process of living ring-opening polymerization comprising the step of exposing α-amino acid N-carboxyanhydride monomers to an initiator having a formula $NH_2CH_2[CH_2NHCH_2]nCH_2NH_2$, wherein n is an integer with value of 1-3 to obtain amino acid polymers, including homopolymers or block copolymers. Use of triethylenetetramine, diethylenetriamine and tetraethylenepentamine exemplified. Representative examples of block copolymers include poly(benzyl-L-glutamate) and poly(benzyl-L-lysine).

6 Claims, 15 Drawing Sheets

(A) "Amine" Mechanism

(B) "Activated Monomer" (AM) Mechanism

METHOD OF PREPARING WELL-DEFINED POLYPEPTIDES VIA ROP

PRIORITY CLAIM

This application claims the benefit under 35 USC 371 to International Application No. PCT/IB2015/001146, filed Mar. 17, 2015, which claims priority to U.S. Provisional Patent Application No. 61/954,262, filed Mar. 17, 2014, each of which is incorporated by reference in its entirety.

TECHNICAL FIELD

The invention relates to methods of using ring opening polymerization.

BACKGROUND

A form of chain-growth polymerization, a ring-opening polymerization process, uses part of a polymer as a reactive center and joins monomers to form a larger polymer chain through propagation. An initiator reacts with a monomer to form an intermediate compound capable of linking successively with a large number of other monomers into a polymeric compound. The initiator can affect the polymerization process, such as initiation rate and polydispersity.

SUMMARY

A fast-rate living ring-opening polymerization of NCA can use initiators that link primary amines to secondary amines by one or more carbon atoms.

In one aspect, a process for living ring-opening polymerization can include exposing an N-carboxyanhydride monomer to an initiator including a first primary amine covalently linked to a first electron donor by a first linking group to form a polyamide polymer.

In another aspect, a polymerization system for forming a polyamide polymer can include an initiator including a first primary amine covalently linked to a first electron donor by a first linking group.

In another aspect, a polymerization initiator for forming a polyamide polymer can include a first primary amine covalently linked to a first electron donor by a first linking group.

The initiator can have specific structural features. The first electron donor can be covalently linked to a second primary amine by a second linking group. The first electron donor can include a secondary amine. The first linking group can include a backbone having from 1 to 4 carbon atoms and covalently linking the first primary amine to the first electron donor. For example, the first linking group can include a $C_nH_{2n}$ group, wherein n is an integer with a value of 1, 2, 3, or 4. The second linking group can include a backbone having from 1 to 4 carbon atoms and covalently linking the first primary amine to the second electron donor. For example, the second linking group can include a $C_nH_{2n}$ group, wherein n is an integer with a value of 1, 2, 3, or 4. In certain embodiments, the secondary amine can include a diethylenetriamine, a triethylenetetramine, or a tetraethylenepentamine.

In certain embodiments, the first electron donor can be covalently linked to a second electron donor by a third linking group. The second electron donor can include a secondary amine.

In certain embodiments, the second electron donor can be covalently linked to a third electron donor by a fourth linking group. The third electron donor can include a secondary amine.

In certain circumstances, the initiator can be metal-free.

In certain circumstances, the process or polymerization system can include conducting the living ring-opening polymerization at room temperature. A molecular weight distribution of a polymer produced by the polymerization system can be between 1.00 and 1.50, for example, between 1.05 and 1.15. The polymerization system can have a catalytic efficiency of more than 99% and a reaction rate constant of more than 0.35, for example, more than 0.4.

Other aspects, embodiments, and features will be apparent from the following description, the drawings, and the claims.

BRIEF DESCRIPTION OF THE DRAWINGS

FIGS. 2A and 2B show two possible functions of the initiator. FIG. 2C shows a proposed mechanism for the ring-opening polymerization ("ROP") of NCA polymerization initiated by triethylenetetramine ("TETA").

DETAILED DESCRIPTION

A process for living ring-opening polymerization can include exposing an N-carboxyanhydride monomer to an initiator including a first primary amine covalently linked to a first electron donor by a first linking group. The initiator can optionally include a second electron donor and/or a second primary amine. The initiator can also further include a third electron donor, and optionally include more electron donor moieties. The electron donor can include an amine, such as a secondary amine. The primary amine and adjacent electron donor can be linked by a 1-4 atom linking group, for example, a C1-C4 alkylene, C1-C4 alkenylene, C3-C8 carbocyclic moiety, which can be optionally substituted.

Polypeptide as a class of important biopolymer has extensive application in many fields such as drug delivery, tissue engineering, sensing and catalysis. See, for example, T. J. Deming, *Adv. Drug Delivery Rev.* 2002, 54, 1145-1155; X. Y. Wang, H. J. Kim, C. Wong, C. Vepari, A. Matsumoto, D. L. Kaplan, *Mater. Today* 2006, 9, 44-53; S. Dos Santos, A. Chandravarkar, B. Mandal, R. Mimna, K. Murat, L. Saucede, P. Tella, G. Tuchscherer, M. Mutter, *J. Am. Chem. Soc.* 2005, 127, 11888-11889; R. J. Mart, R. D. Osborne, M. M. Stevens, R. V. Ulijn, *Soft Matter* 2006, 2, 822-835, each of which is incorporated by reference in its entirety. One method for preparation of polypeptides is ring-opening polymerization ("ROP") of α-Amino Acid N-carboxyanhydrides (NCAs) mediated by different nucleophiles (typically amines) or bases (typically metal alkoxides). See, for example, T. J. Deming, *Adv. Polym. Sci.* 2006, 202, 1-18, which is incorporated by reference in its entirety. The NCA monomers have more than 100-years of history and their polymerizations were extensively utilized throughout the 1950s to 1970s, but no controlled polymerization system was established until the late 1990s. See, for example, H. R. Kricheldorf, *Angew. Chem. Int. Edit.* 2006, 45, 5752, which is incorporated by reference in its entirety. After 1997, a few controlled NCA polymerizations were reported by employing primary amine hydrochlorides, transition metal complex or organosilicon reagent derivative as initiator, or using conventional amine initiator under high vacuum and/or low temperature. See, for example, I. Dimitrov, H. Schlaad, Chem. Commun. 2003, 2944-2945; T. J. Deming, Nature 1997, 390, 386-389; T. J. Deming, J. Am. Chem. Soc. 1998, 120, 4240-4241; H. Lu, J. Cheng, J. Am. Chem. Soc. 2007, 129, 14114; T. Aliferis, H. Iatrou, N. Hadjichristidis, Biomacromolecules 2004, 5, 1653-1656, each of which is incorporated by reference in its entirety.

Figure 1:
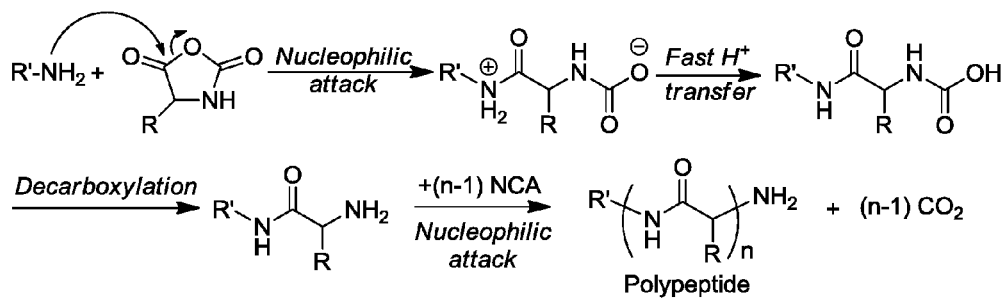
FIG. 1 shows "Amine" mechanism and "Activated Monomer" mechanism for the polymerization of α-Amino Acid N-carboxyanhydrides ("NCAs") initiated by amines.
Figure 1:
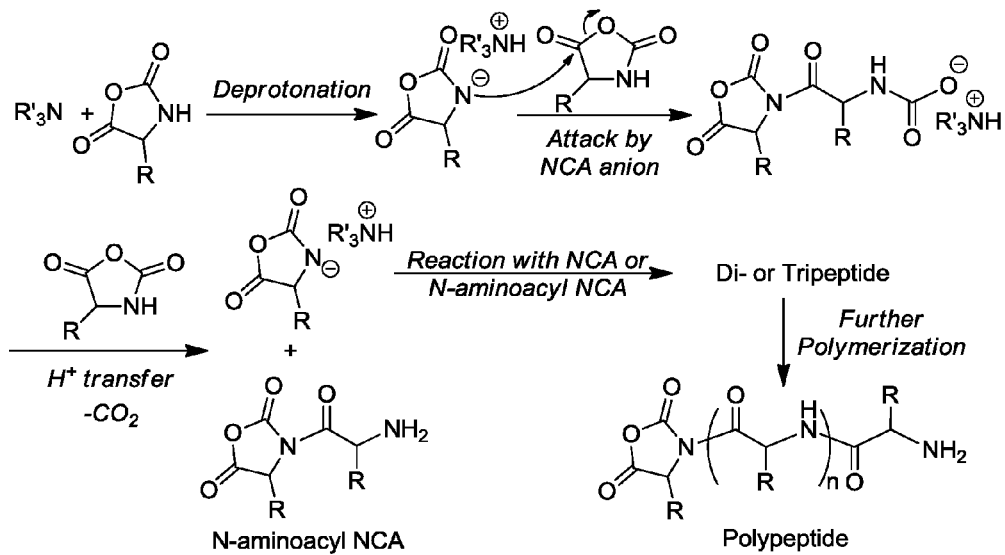

Organic amines, as easily accessible and metal-free initiators, can produce a clean polypeptide in large scale and with high molecular weight, but the resulted polypeptides usually possessed uncontrollable molecular weights and broad molecular weight distributions due to two inconsistent polymerization modes, the so-called "normal amine" (NA) and "activated monomer" (AM) mechanisms. Principally, the former was attributed to the polymerization with primary amines, stronger nucleophiles than basic initiators, and the latter to the metal alkoxides or tertiary amines, stronger basic than nucleophile initiators. The coexistence of both mechanisms was proposed when secondary amines, weak nucleophile/basic initiators, were the active species (FIG. 1). However, in practice, neither primary amines nor tertiary amines adopted a single mechanism during the polymerization. The polymerizations usually switched back and forth many times between the two different mechanisms and gave bad control over the molecular weight and distribution of obtained polypeptide. See, for example, N. Hadjichristidis, H. Iatrou, M. Pitsikalis, G. Sakellariou, *Chem. Rev.* 2009, 109, 5528-5578, which is incorporated by reference in its entirety. As for the case of secondary amines, the situation would be more complicated with regard to polymerization mechanism and the role of cyclization.

Although primary, secondary and tertiary amines were extensively used in NCA polymerization, their combinations were not previously investigated, most likely because such "marriages" might complicate NCA polymerization in view of the complexity of polymerization mechanism.

A process for ring-opening polymerization can include exposing a monomer to an initiator covalently linked to a first electron donor by a first linking group. The monomer can include an N-carboxyanhydride. The ring-opening polymerization can be a living process. The first electron donor can be covalently linked to a second primary amine by a second linking group. The initiator can include a second electron donor covalently linked to the first electron donor by a third linking group, and optionally a third electron donor covalently linked to the second electron donor by a fourth linking group. The electron donor can be an amine, such as a secondary amine.

The linking group, either a first linking group or a second linking group or a third linking group or a fourth linking group, can have up to 4 carbon atoms between the groups, which can be optionally substituted. Each linking group can include a backbone having from 1 to 4 carbon atoms and covalently linking the first primary amine to the first electron donor. Each linking group can include a backbone having from 1 to 4 carbon atoms and covalently linking the first primary amine to the second electron donor. Each linking group can include a backbone having from 1 to 4 carbon atoms and covalently linking the first hydrogen acceptor to the second electron donor. The linking group can include a backbone having from 1 to 4 carbon atoms and covalently linking the second hydrogen acceptor to the third electron donor. The optional substituents can be halo, alkyl, amino, hydroxy, cyano or nitro groups. An alkyl substituent can form a ring.

The linking group can be an aliphatic group, such as a straight chain, a branched chain, or part of a ring. The linking group can include a $C_nH_{2n}$ group, where n is an integer. The linking group can include a carbon-carbon single bond, a carbon-carbon double bond, or a carbon-carbon triple bond. The linking group can be part of an aromatic.

The electron donor, either the first electron donor or the second electron donor or the third electron donor, can include an electronegative atom, such as nitrogen, fluorine, or oxygen. A electron donor can include an amine, such as a primary amine, a secondary amine, or a tertiary amine.

In one example, during ROP of NCAs, primary amines, if married with secondary amines, can mediate living ROP of NCAs and give well-defined polypeptides in high yields at room temperature. Metal-free initiators can be used for NCA living polymerization.

Triethylenetetramine (TETA) is an example of "married" amines in which primary and secondary amine are combined together. TETA alone can show activity toward NCA polymerization. In contrast to traditional amine initiators which usually need multiple day time periods to reach high monomer conversion and low temperature to decrease the side reactions to make polymerization controllable, TETA can give very high activity and can control the polymerization at room temperature.

Combined or married amines, such as a compound with a formula of $NH_2CH_2[CH_2NHCH_2]_nCH_2NH_2$, where n is an integer with a value of at least one, for example, 1, 2, 3, or 4, can be used in a polymerization process. Examples of the compound include Triethylenetetramine (TETA), Diethylenetriamine (DETA), Tetraethylenepentamine (TEPA), and similar compounds.

Figure 2A:
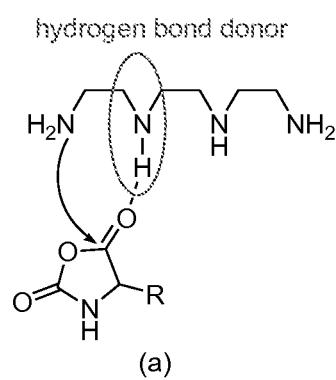
FIGS. 2A-2C show proposed mechanisms of action of the initiators in the ROP system.
Figure 2B:
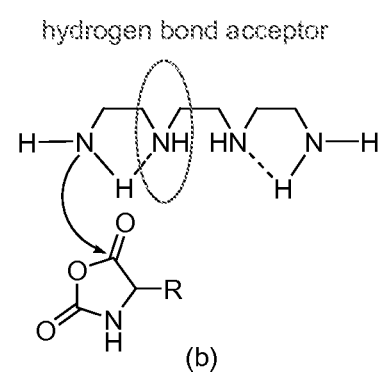
Figure 2C:
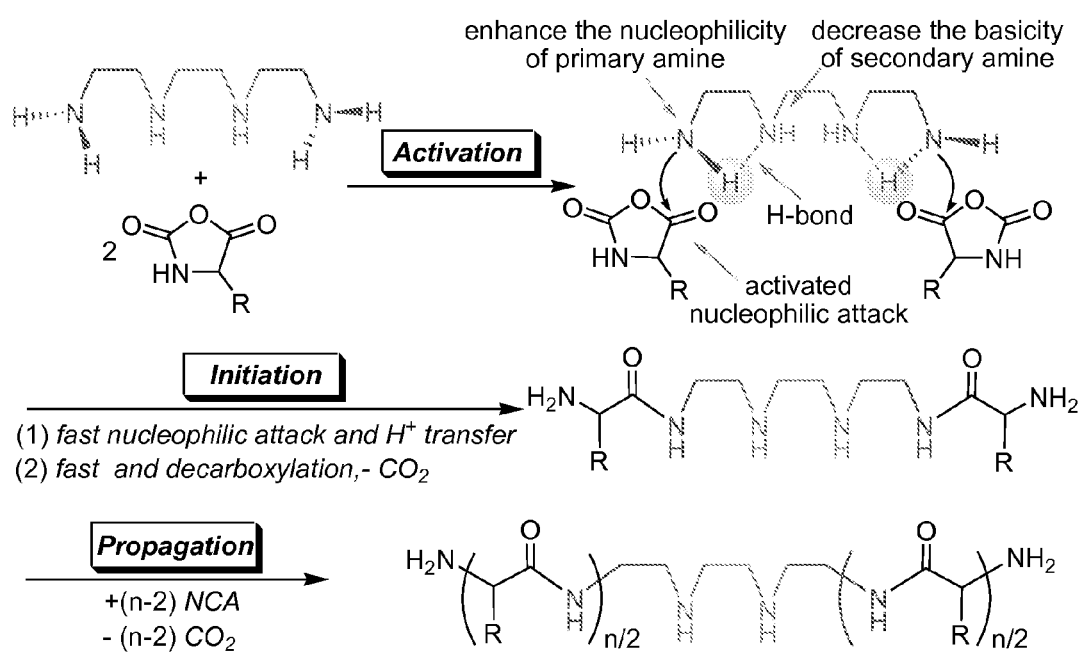

The formation of associations between oligopeptide and NCA monomer and between different growing oligopeptide by hydrogen bonds can give a kind of phase separation on the molecular level and endowed polypeptide chains with different reactivity during polymerization which was responsible for the broad distribution of ultimate polymer. See, for example, D. G. H. Ballard, C. H. Bamford, *J. Chem. Soc.* 1959, 1039, which is incorporated by reference in its entirety. It's possible that urea can compete with the NCA and the peptide chains for the formation of hydrogen bonds, disturb the association of different polymer chains during polymerization, and help amine initiator to result in polypeptide with a narrow and monomodal molecular distribution at low temperature. See, for example, W. Vayaboury, O. Giani, H. Cottet, S. Bonaric, F. Schué, *Macromol. Chem. Phys.* 2008, 209, 1628-1637, which is incorporated by reference in its entirety. Without being bound to any particular theory, some potential mechanisms are shown in FIGS. 2A-2C. There are at least two possible mechanisms. In one possible mechanism (FIG. 2A), the secondary amine moiety can function as a hydrogen bond donor. In another possible mechanism (FIG. 2B), the secondary amine moiety can function as a hydrogen bond acceptor. It's possible that for polymerization system using combined amines, the catalysis proceeded by activation of the primary amine via nitrogen of the secondary amine by forming hydrogen bond. The activated primary amine can attack the carbonyl carbon (C-5) of NCA monomer, leading to initiation, whereby the ring-opened NCA can decarboxylate and form a new propagating primary amine for the subsequent addition of monomer (FIG. 2). During polymerization, the second amine anchored in polymer chains can keep activating the propagating primary amines at the chain ends, enhance their nucleophilicity. At the same time, the second amine can suppress the associations of growing polypeptide chains and make all primary amine groups have similar reactivity. The aforementioned kinetic experiment results support that the dependency on initiator concentration was close to one and polymer chains propagated on one type of active center of a given reactivity. The second amine can be the reason that the polymerization proceeds with high activity and gives the best results concerning the agreement between the experimentally observed and the stoichiometric molecular weights and low PDI of obtained polymer.

Primary amines, when linked to secondary amines by one or more carbon atoms, can function as excellent initiators for living ROP of α-amino acid N-carboxyanhydrides. In contrast to traditional amine-mediated NCA polymerizations, polymerizations initiated by the "married" amines don't require low temperature to avoid the side reactions and can be operated at room temperature to give well-defined polypeptides, which is desirable for most of living polymerization. This indicates that effective metal-free initiator can be used for NCA polymerization.

EXAMPLE

General Methods.

All reactions were carried out under a dry and oxygen-free argon atmosphere by using Schlenk techniques or under a argon atmosphere in an MBraun glovebox. Solvents were purified by an MBraun SPS system. Anhydrous dimethylformamide (DMF) was dried by an aluminum column. Anhydrous DMSO-$d_6$ was dried with calcium hydride at 70° C. under Ar overnight followed by distillation under reduced pressure. All liquids were dried over activated 4 Å molecular sieves for a week and distilled before use, and solid materials were used as received. All purified anhydrous reagents were stored in the presence of 4 Å molecular sieves in a glove box. H-Glu(OBn)-OH and H-Lys(Z)-OH were purchased from Sigma-Aldrich and used as received. Glu-NCA and Lys-NCA were prepared and recrystallized four times by following the published procedures. See, for example, Lu, H.; Cheng, J. *J. Am. Chem. Soc.* 2007, 129, 14114-14115, which is incorporated by reference in its entirety.

Instruments and Measurements.

$^1H$, $^{13}C$ NMR spectra were recorded on a Bruker AV400 (FT, 400 MHz for $^1H$; 100 MHz for $^{13}C$) spectrometer. NMR assignments were confirmed by $^1H$—$^1H$ (COSY), $^1H$—$^{13}C$ (HMQC), and $^{13}C$ NMR (DEPT) experiments when necessary. Infrared spectra were recorded on a Thermo Scientific Nicolet iS10 spectrophotometer. The real-time concentration of NCA was quantified by measuring the intensity of NCA's anhydride peak at 1790 $cm^{-1}$ by FT-IR. The conversion of NCA was determined by comparing the NCA concentration in the polymerization solution with the NCA concentration at t=0. Polymer characterizations were carried out by combining a Waters 515 GPC instrument with multiangle laser light scattering (MALLS) apparatus at 25° C. The system included three Styragel® columns, a 515 HPLC pump, an OPTILAB DSP RI detector, and a DAWN EOS multiangle laser-light scattering (MALLS) detector at a laser wavelength of 690 nm (from Wyatt Technology). One guard column and three 7.8×300 mm columns (Styragel® HT 2 DMF, Styragel® HT 3 DMF and Styragel® HT 4 DMF) were used for polymer fractionation. HPLC-grade DMF (containing 0.1 M LiBr) was used as the mobile phase at a flow rate of 0.8 mL/min. The whole system, including columns and detectors, was maintained at 60° C. Polymers solutions with a concentration between 8.0 and 10.0 mg/mL were injected into the columns at an injection volume of 200 µL. Astra software from Wyatt Technology was used to collect and analyze the data from the detectors.

Typical Polymerization Procedure.

A typical procedure for polymerization of NCA was performed in a 10 mL ampule in a Braun Labmaster glovebox. To a vigorously stirred solution of TETA in 2 mL of DMF was added 0.2 g NCA monomer in 2 mL of DMF. The reaction mixture was stirred for specific time at room temperature. After the measured time interval, a small amount of aliquot (several drops) was taken from the reaction mixture via syringe for the determination of monomer conversion via FT-IR. At the same time, 0.2 ml reaction mixture was taken out system and diluted to 10 mg (PBLG)/mL using DMF (containing 0.1 M LiBr), then the solution was analyzed by GPC to measure the molecular weight of PBLG. The remaining reaction mixture was precipitated with methanol, sonicated and centrifuged to remove the solvent. The obtained PBLG was collected and dried under vacuum overnight after repeating two more times of sonication-centrifugation procedure.

Polymerization using TETA

Figure 3:
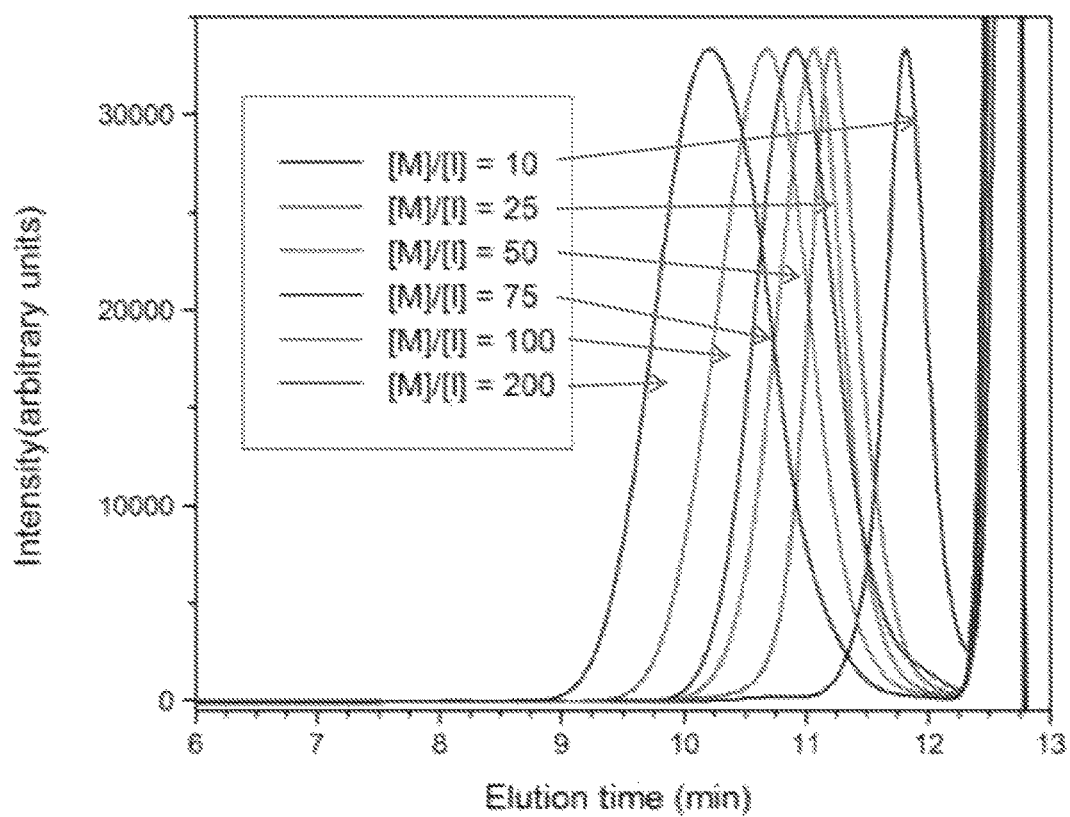
FIG. 3 shows gel permeation chromatography ("GPC") profiles of representative samples, entries 1, 2, 5, 7, 9 and 12 in Table 1.

As shown in table 1, TETA showed high activity toward NCA-ROP and exerted controls over molecular weight ("MW") and Polydispersity index ("PDI") of obtained polypeptides. All polymerizations can be accomplished with >99% monomer conversion in 3 hours at room temperature. Under a broad range of NCA-to-initiator molar ratios, the polymerizations performed fluently to give polypeptides with variable molecular weights ($M_n$=1.00×10$^4$–5.86×10$^4$) and narrow molecular weight distributions (PDI=1.08–1.29, for GPC curves see FIG. 3). The molecular weights of the resultant polypeptides can be very close to the theoretic values, suggesting a 100% catalytic efficiency of the system. Table 1 Shows Polymerization of Glu-NCA Initiated by Various Amines.

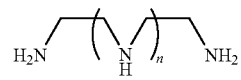

n = 1, DETA
n = 2, TETA
n = 3, TEPA

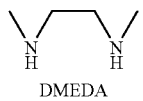

DMEDA

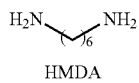

HMDA

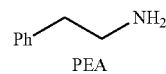

PEA

| Entry[a] | Initiator | [M]$_0$/[I]$_0$ | Time (min) | Conv. (%)[b] | $M_{n,calcd}$ × 10$^{-4}$[c] | $M_{n,exp}$ × 10$^4$[d] | $M_w$/$M_n$[e] |
|---|---|---|---|---|---|---|---|
| 1 | TETA | 10/1 | 40 | >99 | 0.22 | 0.23 | 1.04 |
| 2 | TETA | 25/1 | 40 | >99 | 0.55 | 0.60 | 1.08 |
| 3[f] | TETA | (25 + 25)/1 | 40 + 40 | >99 | 1.10 | 1.20 | 1.13 |
| 4[g] | TEAT | (25 + 25)/1 | 40 + 120 | >99 | 1.20 | 1.26 | 1.10 |
| 5 | TETA | 50/1 | 40 | 90 | 0.99 | 1.03 | 1.11 |
| 6 | TETA | 50/1 | 60 | >99 | 1.10 | 1.17 | 1.11 |
| 7 | TETA | 75/1 | 60 | 89 | 1.46 | 1.54 | 1.15 |
| 8 | TETA | 75/1 | 120 | >99 | 1.64 | 1.64 | 1.18 |
| 9 | TETA | 100/1 | 60 | 84 | 1.84 | 1.90 | 1.14 |
| 10 | TETA | 100/1 | 120 | >99 | 2.19 | 2.32 | 1.18 |
| 11 | TETA | 120/1 | 60 | 82 | 2.16 | 2.23 | 1.18 |
| 12 | TETA | 200/1 | 180 | >99 | 4.38 | 4.51 | 1.29 |
| 13 | DETA | 75/1 | 60 | 90 | 1.48 | 1.55 | 1.14 |
| 14 | TEPA | 75/1 | 60 | 89 | 1.46 | 1.53 | 1.20 |
| 15 | HMDA | 75/1 | 60 | 51 | 0.84 | 1.00 | 1.18 |
| 16 | HMDA | 75/1 | 720 | >99 | 1.64 | 2.00 | 1.20 |
| 17 | PEA | 75/1 | 60 | 35 | 0.58 | 0.80 | 1.19 |
| 18 | PEA | 75/1 | 720 | >99 | 1.64 | 1.90 | 1.21 |
| 19 | PEA | 75/2 | 60 | 60 | 0.49 | 0.60 | 1.18 |
| 20 | PEA | 75/2 | 720 | >99 | 0.82 | 0.95 | 1.21 |
| 21[h] | DMEDA | 75/1 | 60 | >99 | 1.64 | 3.21 | 1.33 |
| 22 | HMDA/DMEDA | 75/(1 + 1) | 60 | 76 | 1.64 | 1.89 | 1.12 |

In table 1, [a]Polymerization was performed in DMF at 25° C. with [Glu-NCA]$_0$ = 0.19M;
[b]FT-IR is used to determine the conversion of NCA by analyzing the intensity of the NCA anhydride absorption band at 1787 cm$^{-1}$;
[c]calculated by [Glu-NCA]/[I] × 219.24 × X (X = Conv.);
[d]determined by $^1$H NMR spectroscopy;
[e]determined by GPC in 0.1M LiBr in DMF at 60° C.;
[f]prepolymerization of Glu-NCA with TETA for 40 min, followed by the addition of another portion of Glu-NCA;
[g]synthesis of PBLG-b-PZLL via the sequential ROP of Glu-NCA and Lys-NCA;
[h]the GPC curve is bimodal.

Figure 4:
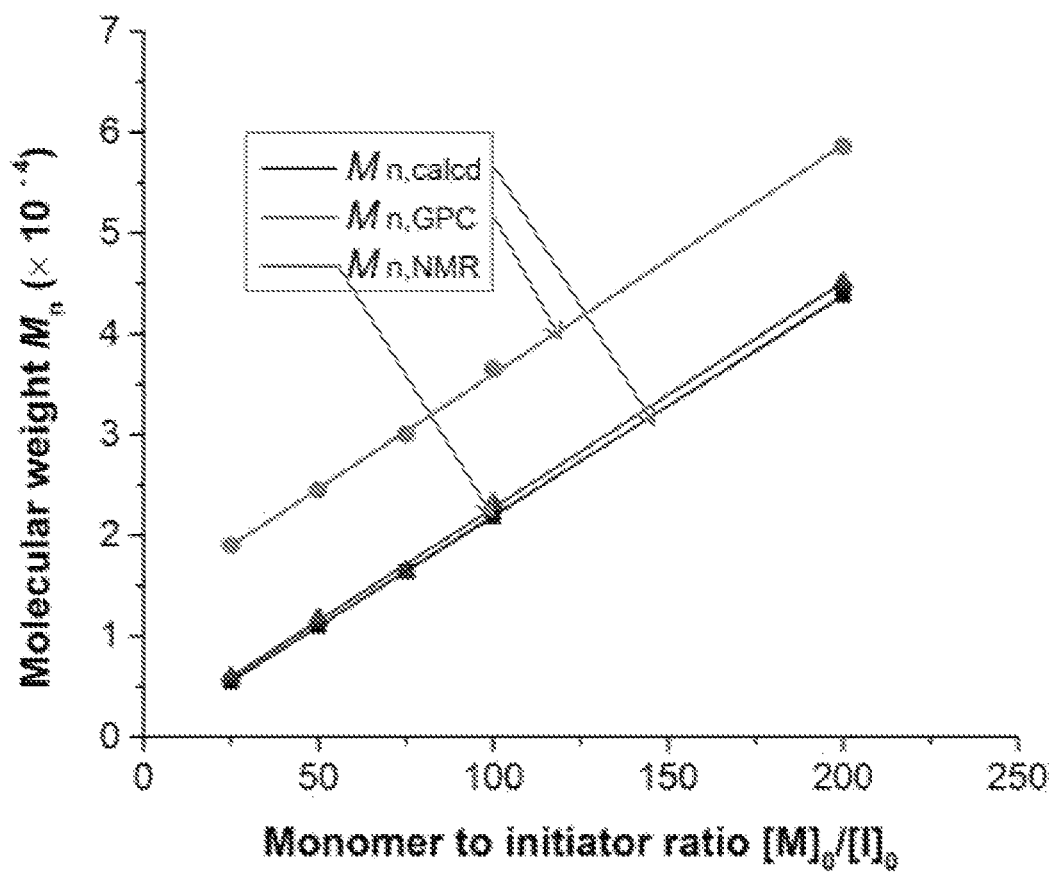
FIG. 4 shows molecular weights ($M_{n,calcd}$: calculated molecular weight; $M_{n,GPC}$: determined by GPC in 0.1M LiBr in DMF at 60° C. using polystyrene calibration; $M_{n,NMR}$: determined by $^1$H NMR) of PBLG samples prepared in dimethylformamide ("DMF") at 25° C. using TETA as initiator at different monomer to initiator ratios $[M]_0/[I]_0$.
Figure 5:
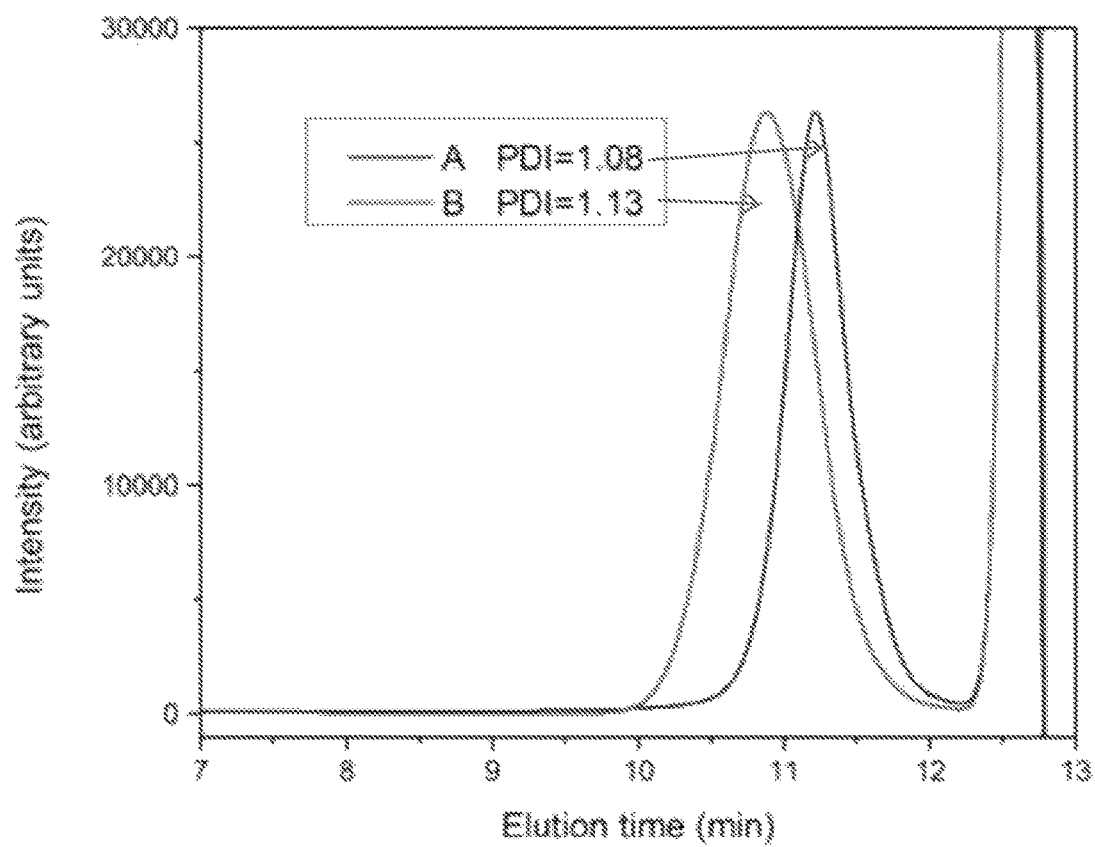
FIG. 5 shows GPC profiles of polymerization resumption experiment: peak A (entry 2), after prepolymerization of Glu-NCA (25 equiv to TETA, 40 min), $M_n$=1.90×10$^4$, PDI=1.08; peak B (entry 3) after polymerization of 25 equiv more Glu-NCA (40 min), $M_n$=2.79×10$^4$, PDI=1.13.
Figure 6:
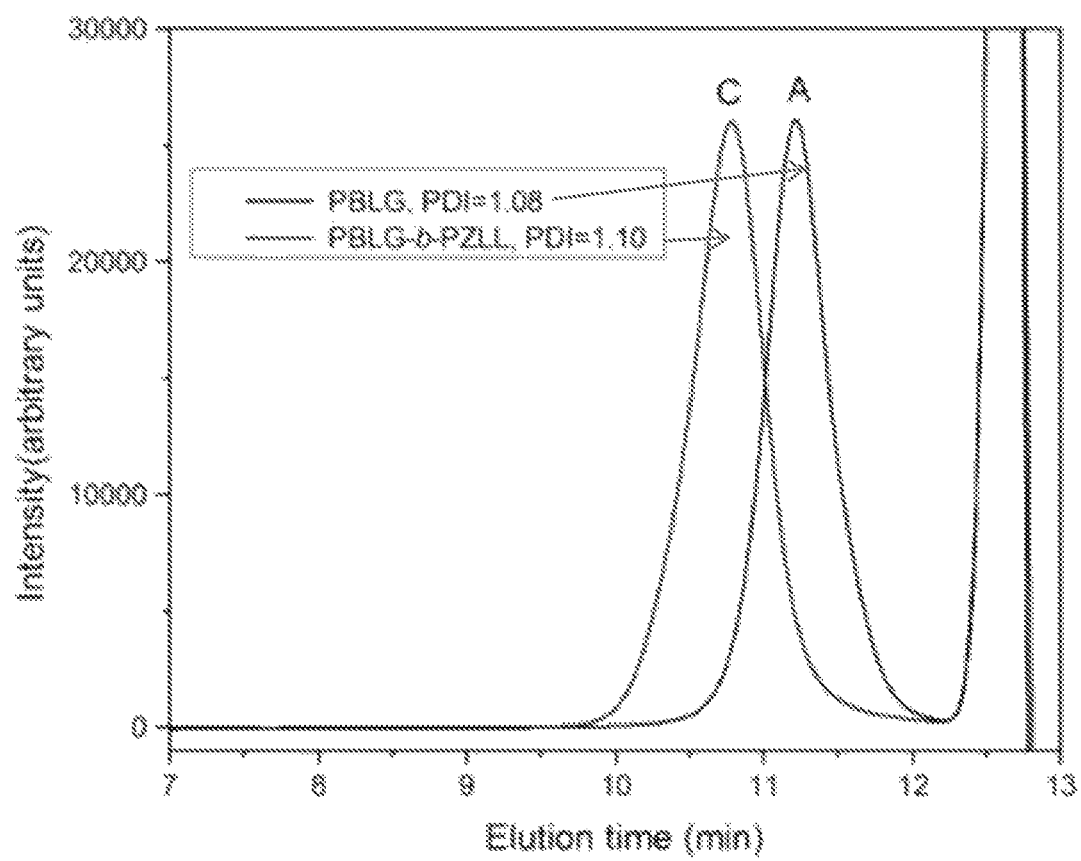
FIG. 6 shows GPC profiles of copolymerization of Glu-NCA and Lys-NCA: peak A (entry 2), after prepolymerization of Glu-NCA (25 equiv to TETA, 40 min), $M_n$=1.90× 10$^4$, PDI=1.08; peak C (entry 4), after block copolymerization of Glu-NCA and Lys-NCA ([Glu-NCA]$_0$/[Lys-NCA]$_0$/[I]$_0$=25/25/1, 120 min), Mn=3.43×10$^4$, PDI=1.10.
Figure 13:
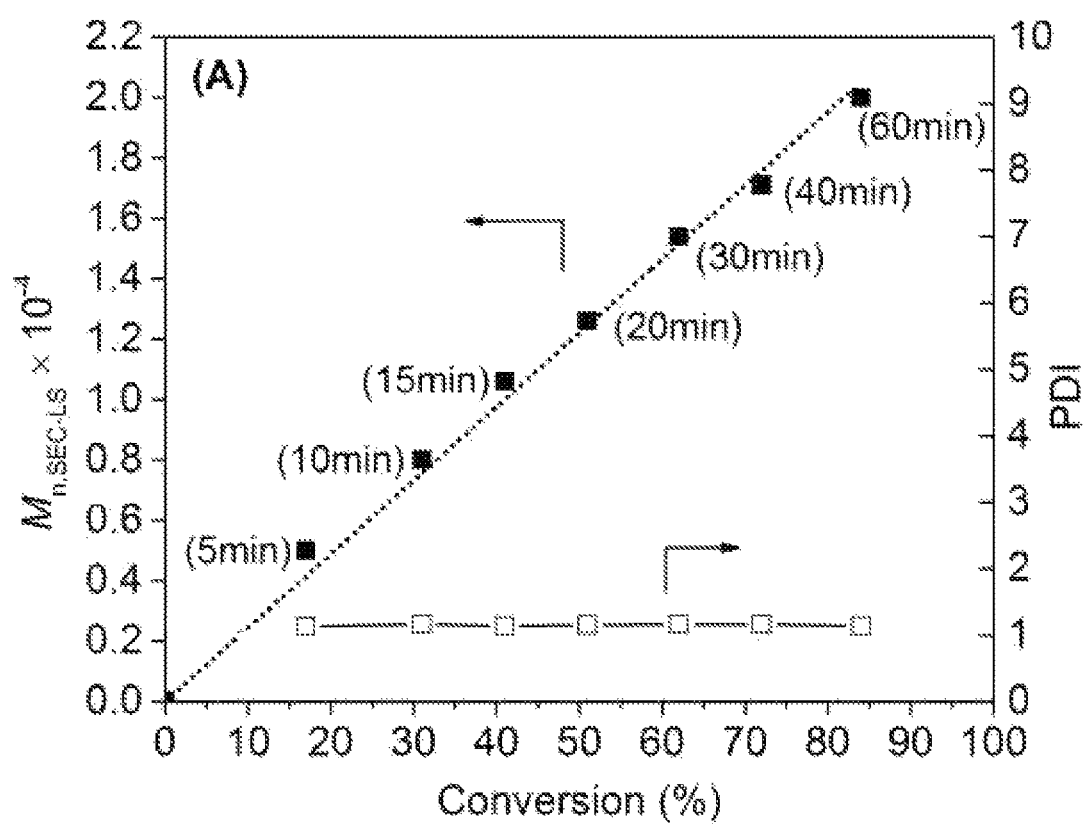
FIG. 13 shows that the number-average molecular weight (Mn) increased linearly with monomer conversion.

A linear relationship between the number-average molecular weight ($M_n$) and the initial monomer-to-initiator ratio ([M]$_0$/[I]$_0$) existed (FIG. 4) and the number-average molecular weight ($M_n$) increased linearly with monomer conversion (FIG. 13), which implied the living character of the polymerization process and the absence of chain-breaking reactions. The living character was further confirmed by the polymerization resumption experiment (entry 3) and by the sequential ROP of Glu-NCA and Lys-NCA (entry 4). In the resumption experiment, excess NCA monomer was added after the polymerization effected by the first addition had gone to completion. The molecular weight increased for the final polymer (peak B, $M_n$=2.79×10$^4$, PDI=1.13), relative to the first (peak A, $M_n$=1.90×10$^4$, PDI=1.08) (FIG. 5). In addition, the PBLG-b-PZLL block copolypeptide can be synthesized by the sequential ROP of Glu-NCA and Lys-NCA monomers (FIG. 6). From the discussion above, the polymerization fulfills all of the requirements of "living polymerization. See, for example, Fetters, L. Encyclopedia of Polymer Science and Engineering, 2nd ed.; Wiley-Interscience: New York, 1987; Vol. 10, pp 19-25, which is incorporated by reference in its entirety.

Figure 7:
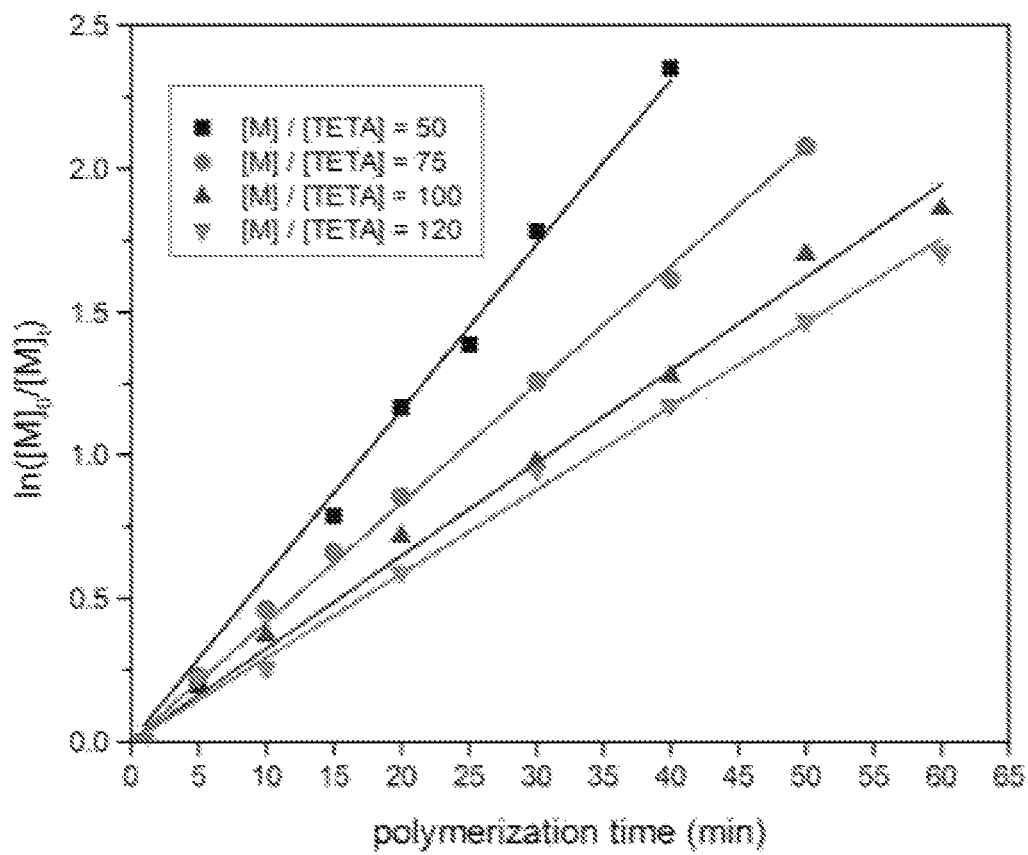
FIG. 7 shows ln([NCA]$_0$/[NCA]$_t$) vs. time for the ROP of NCA initiated by TETA. Conditions: [NCA]$_0$=0.19 mM, DMF, 25° C., [NCA]/[TETA]=50 ([TETA]$_0$=3.80 mM, ■), 75 ([TETA]$_0$=2.53 mM, ●), 100 ([TETA]$_0$=1.90 mM, ▲), 120 ([TETA]$_0$=1.58 mM, ▼).
Figure 8:
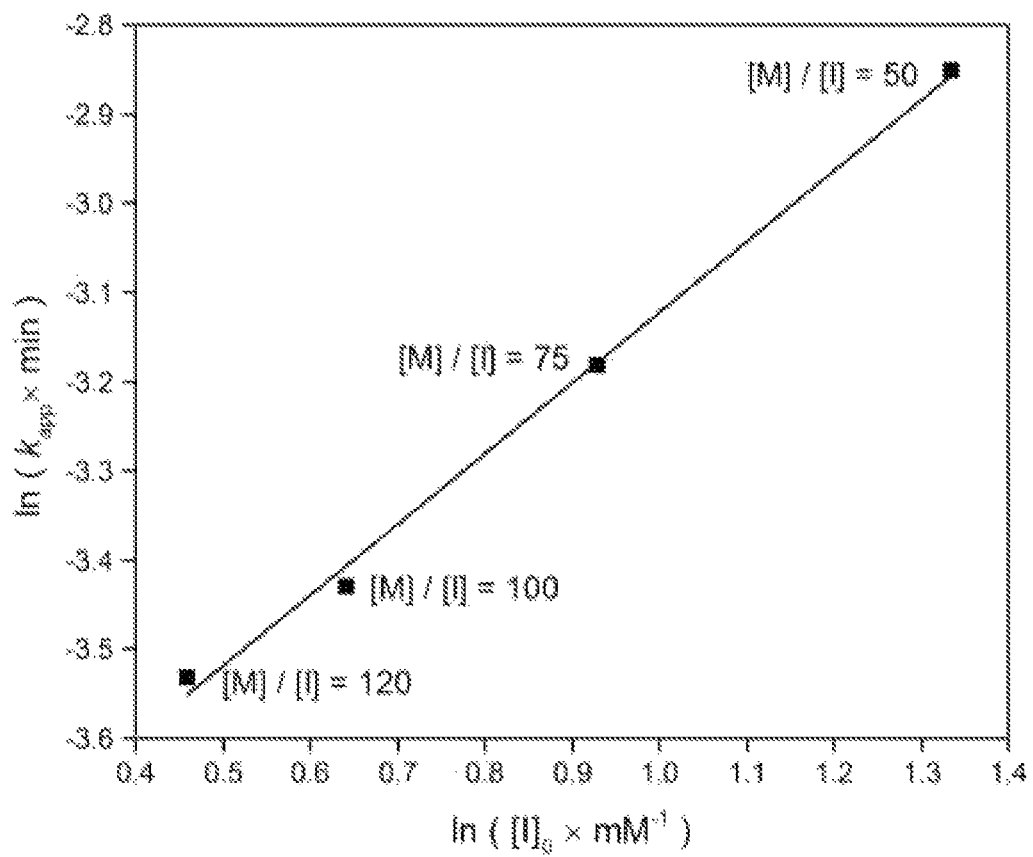
FIG. 8 shows ln$k_{app}$ vs. ln[TETA]$_0$ for the ROP of NCA initiated by TETA. Conditions: [NCA]$_0$=0.19 mM, DMF, 25° C.
Figure 9:
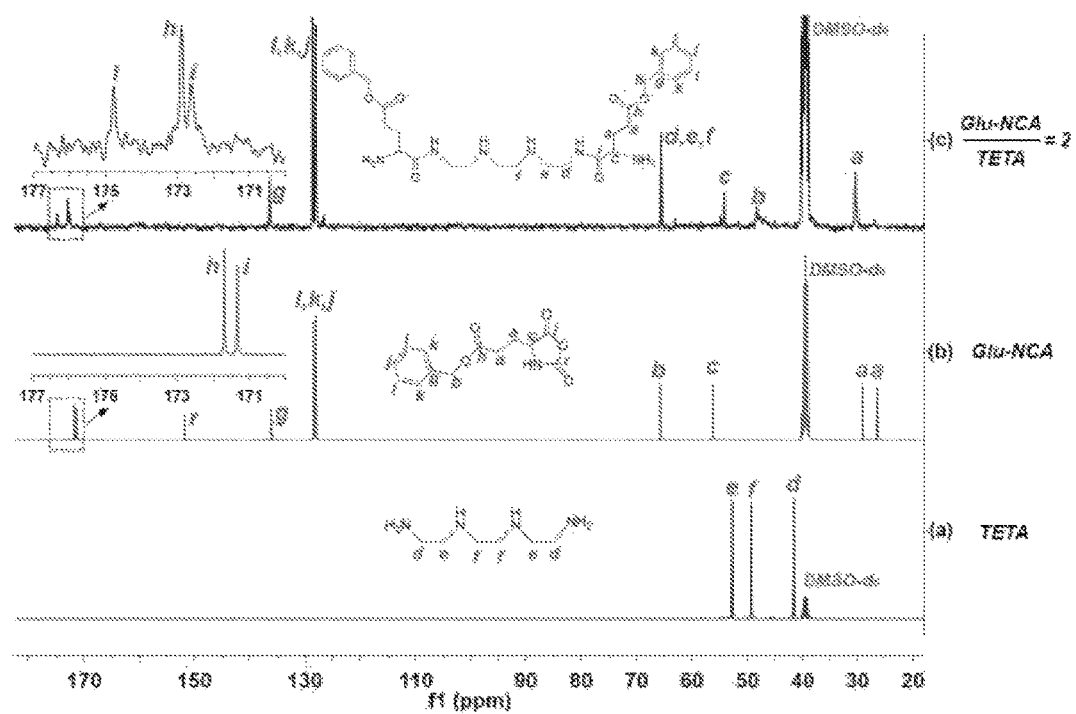
FIG. 9 shows $^{13}$C analysis of mixture of triethylenetetramine (TETA) and Glu-NCA (TETA/Glu-NCA=1:2) in DMSO-d$_6$ at 25° C., (a) Triethylenetetramine (TETA) initiator, (b) Glu-NCA monomer and (c) Glu-NCA/TETA (2:1) mixture.

Kinetics of TETA-mediated NCA-ROP was investigated in DMF at 25° C. by monitoring the conversion of NCA versus time with FT-IR. Fixing the initial concentration of [TETA]$_0$ at 3.80, 2.53, 1.90 and 1.58 mM, respectively, the ln([NCA]$_0$/[NCA]$_t$) values calculated from the conversions were plotted versus polymerization time to give straight lines with zero intercepts accordingly (FIG. 7), which indicated that polymerization proceeded in a first-order dependence on NCA concentration and an absence of termination. So, the rate equation can be written as $-d[NCA]/dt=k_{app}[NCA]$ where $k_{app}=k_p[TETA]^x$. According to the slops of the straight lines, the $k_{app}$ values were calculated to be 0.0578, 0.0415, 0.0324, 0.0292 min$^{-1}$, respectively. The order in TETA concentration x was determined as the slope of ln $k_{app}$ vs ln[TETA]$_0$ line being 0.80, while the rate constant $k_p$ as the exponent of intercept being 0.0199 mM$^{-1}$min$^{-1}$, respectively (FIG. 8). The overall kinetic law was depicted as $-d[NCA]/dt=k_p[TETA]^{0.8}[NCA]$. A fist-order dependence on [NCA] indicated that the polymerization followed exclusively the "amine mechanism" ($^{13}$C analysis of mixture of TETA and Glu-NCA (TETA/Glu-NCA=1:2) in DMSO-$d_6$ at 25° C. give a further support of the mechanism, see FIG. 9). See, for example, H. R. Kricheldorf, "α-Aminoacid-N-Carboxy-Anhydrides and Related Heterocycles", Springer Publ., Berlin 1987, which is incorporated by reference in its entirety. An observed fractional dependency 0.80 (close to one) on initiator concentration suggested that nearly all active species were unimeric and non-aggregated and polymer chains propagated on one type of active center of a given reactivity. See, for example, S. Penczek, A. Duda, Makromol. Chem. Macromol. Symp. 1991, 47, 127-140; A. Duda, S. Penczek, Macromol. Rapid. Commun 1994, 15, 559-566, each of which is incorporated by reference in its entirety.

Figure 14:
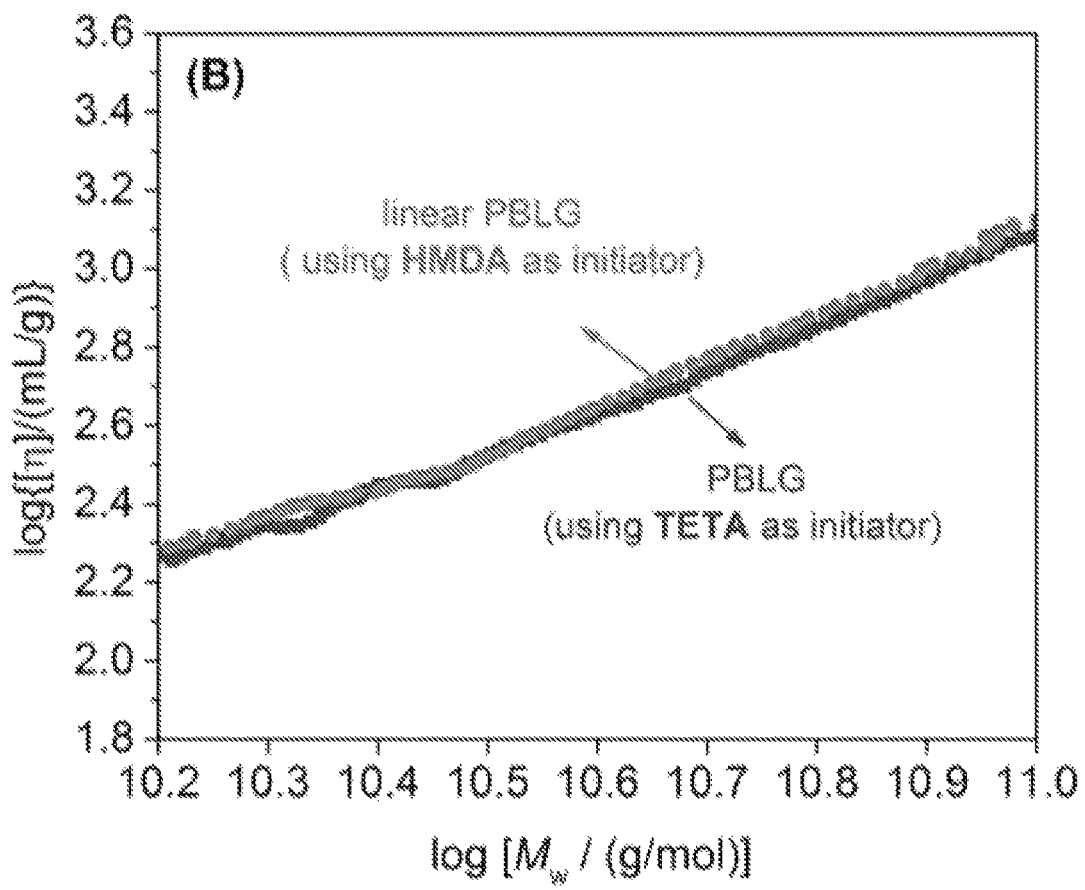
FIG. 14 shows that polypeptide from TETA-initiated ROP of NCA possessed a linear structure.

Mark-Houwink-Sakurada plots of PBLGs obtained from the ROP of Glu-NCA initiated by TETA or HMDA confirmed that polypeptide from TETA-initiated ROP of NCA possessed a linear structure (FIG. 14).

Polymerization using Different Amines

Figure 10:
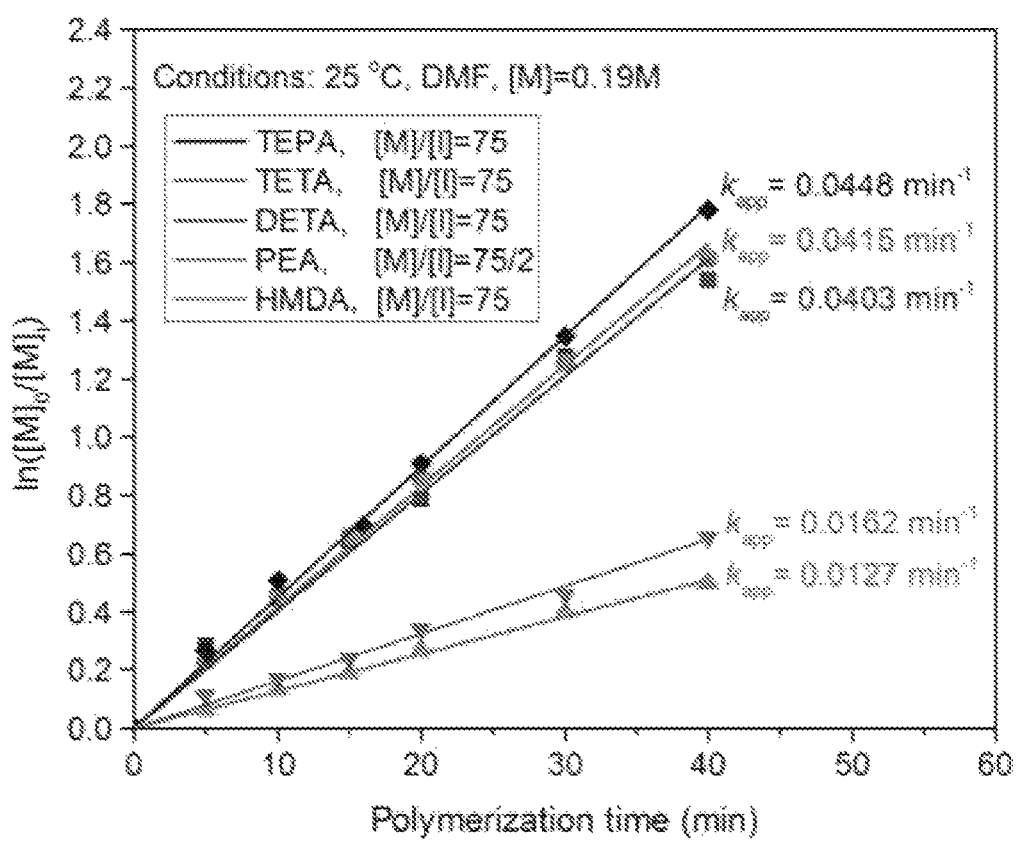
FIG. 10 shows ln([NCA]$_0$/[NCA]$_t$) vs. time for the ROP of NCA initiated by TETA, DETA, HMDA or PEA; conditions: [NCA]$_0$=0.19 M, DMF, 25° C.

To further determine the initiating group of TETA, polymerization of NCA initiated by different polyamines (DETA, TETA and TEPA) were investigated under the same conditions. DETA, TETA and TEPA have same number of —NH$_2$ but different —NH—. The kinetic experiments revealed that all polymerizations followed the rate law: —d[NCA]/dt=$k_{app}$[NCA] for $k_{app}$=$k_p$[I], where [I]=[DETA], [TETA] or [TEPA]. The ratio of rate constants achieved from the polymerizations by different initiators was $k_{p,DETA}$:$k_{p,TETA}$:$k_{p,TEPA}$=0.97:1:1.08, consistent with the number of —NH$_2$ groups of DETA, TETA and TEPA, and inconsistent with the number of —NH— groups (FIG. 10). So, only the —NH$_2$ groups in TETA initiated the polymerization.

Usually, the nucleophilicity of one reagent increases with its basicity, TETA's excellent control over polymerization was originally attributed to the appropriate basicity (p$K_4^{25}$=9.92) which is medium compared to conventional primary amine used for NCA polymerization (Hexamethylenediamine p$K_2^{25}$=11.02, n-butylamine p$K^{25}$=10.66, n-Hexylamine p$K^{25}$=10.64, Cyclohexylamine p$K^{25}$=10.63, Phenethylamine p$K^{25}$=9.88, Benzylamine p$K^{25}$=9.33). Medium basicity can reduce the chance to subtract the proton of the 3-N of NCA monomer and push the polymerization to proceed in a relative pure "amine" mechanism. However, polymerizations of Glu-NCA initiated with Phenethylamine (PEA) (p$K^{25}$=9.88, much closed to TETA's p$K_a$ value) gave very low activity and resulted PBLG with relative high PDI, which indicated that TETA's performance shouldn't be attributed to its nucleophilicity.

The NCA polymerizations initiated by diethylenetriamine (DETA) were compared with tetraethylenepentamine (TEPA) and hexamethylene-diamine (HMDA). DETA and TEPA have similar structure as TETA, while HMDA has straight chain structure as TETA but doesn't bear second amine. HMDA was expected to have higher activity than TETA due to its higher p$K_a$ value (p$K_2^{25}$=11.02). However, kinetics showed that DETA and TEPA had similar activities as TETA towards NCA polymerization (the $k_{app}$ values are much closed) and HMDA had a very low activity (the $k_{app}$ value was less than ⅓ of TETA's and only 51% monomer conversions was achieved in 1 h). Especially, DETA and TEPA gave much better control over PDI and MW than HMDA. Thus, TETA's good control over NCA polymerization can be related with the secondary amines in TETA and a synergy between primary and secondary amine groups can be involved and produce an effect better than their individual effects during polymerization (FIG. 2).

Figure 11:
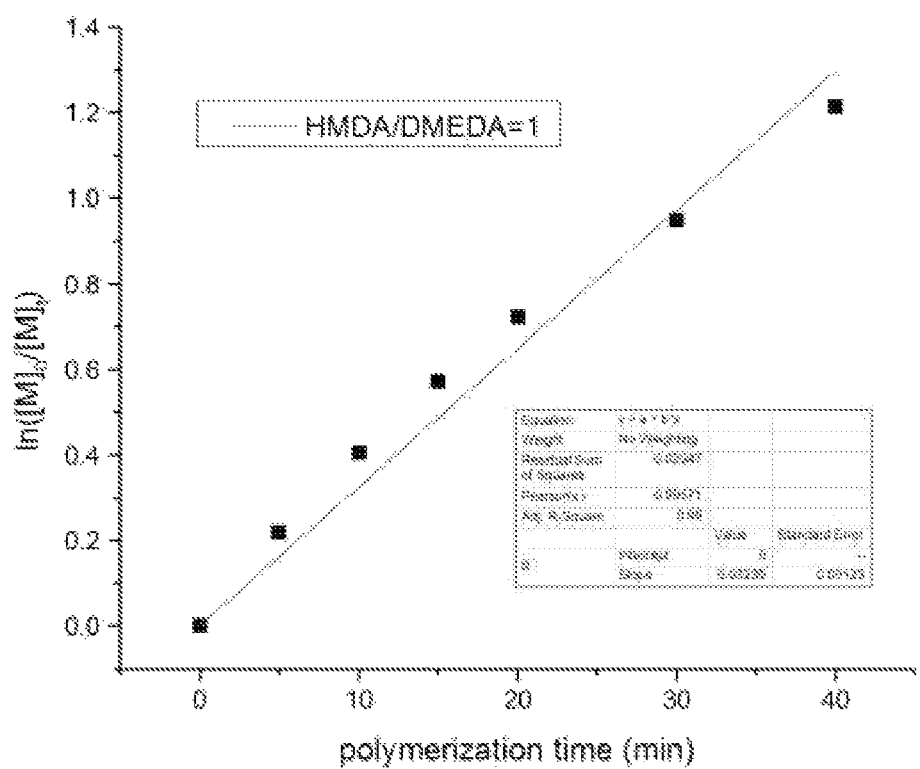
FIG. 11 shows ln([NCA]$_0$/[NCA]$_t$) vs. time for the ROP of NCA initiated by HMDA/DMEDA (1/1); conditions: [NCA]$_0$=0.19 M, DMF, 25° C.
Figure 12:
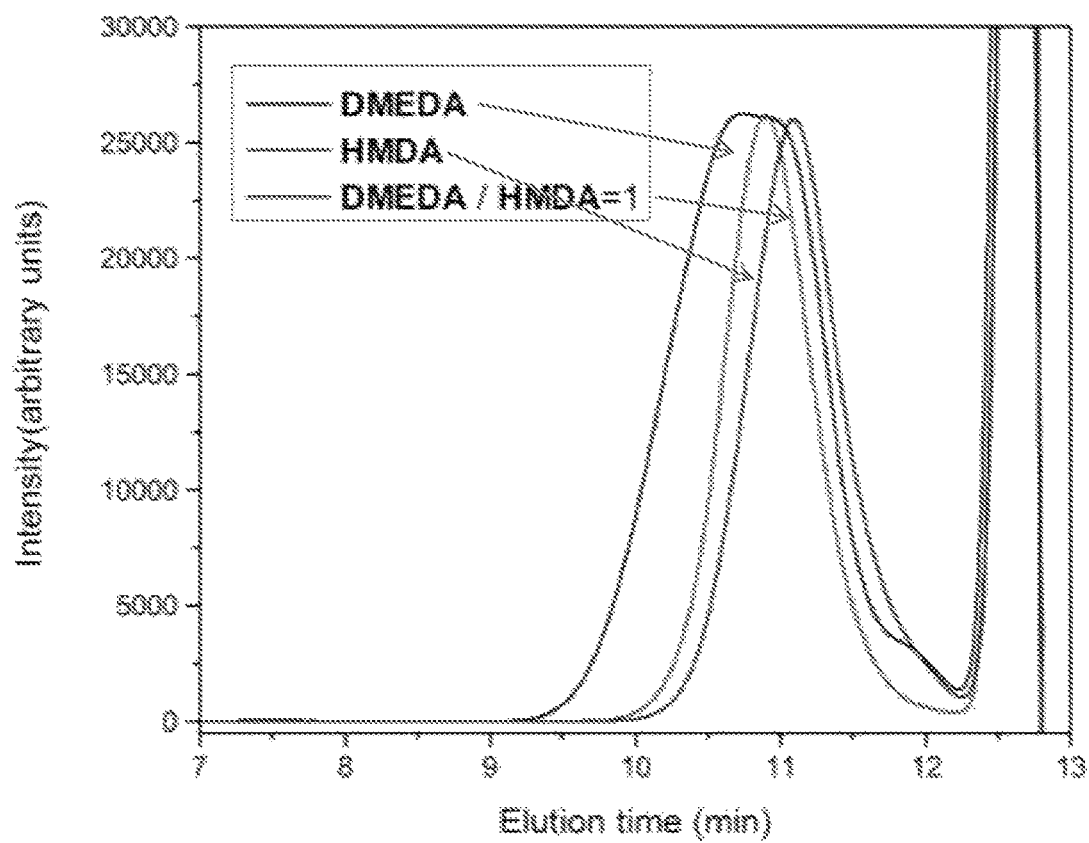
FIG. 12 shows GPC profiles of polypeptides obtained from polymerizations initiated by DMEDA, HMDA and HMDA/DMEDA (1/1), [M]/[I]=75, DMF, monomer conversion>99%.

HMDA combined with N,N'-Dimethyl-1,2-ethanediamine (DMEDA), a secondary amine, was used for NCA polymerization. Remarkably, when equivalent DMEDA (vs. HMDA) was added to the system with HMDA, the $k_{app}$ value (0.0324 min$^{-1}$) of the polymerization is 2.6 times as high as that of the polymerization initiated by HMDA alone and slightly less than the value (0.0415 min$^{-1}$) obtained from TETA-mediated polymerization (FIG. 11). Especially the obtained polymer possessed very low PDI and very symmetric GPC curve that dramatically different from the polymer prepared alone by DMEDA (FIG. 12).

Other embodiments are within the scope of the claims.

What is claimed is:

1. A process for living ring-opening polymerization comprising exposing an α-amino acid N-carboxyanhydride monomers to an initiator having a formula NH$_2$CH$_2$[CH$_2$NHCH$_2$]nCH$_2$NH$_2$, wherein n is an integer with value of 1-3 to form an amino acid polymer.

2. The process of claim 1, wherein the initiator is selected from the group consisting of triethylenetetramine, diethylenetriamine, tetraethylenepentamine, and combinations thereof.

3. The process of claim 1, wherein the amino acid polymer is a homopolymer.

4. The process of claim 1, comprising polymerizing a mixture of different α-amino acid N-carboxyanhydride monomers to form the amino acid polymer.

5. The process of claim 1, wherein the amino acid polymer comprises a block copolymer.

6. The process of claim 5, wherein the block copolymer comprises poly(benzyl-L-glutamate) and poly(benzyl-L-lysine).

* * * * *